United States Patent

Feit et al.

[11] 3,898,266
[45] Aug. 5, 1975

[54] METHYLSULFONYL-BENZOIC ACID DERIVATIVES

[75] Inventors: Peter Werner Feit, Gentofte; Ole Bent Tvaermose Nielsen, Vanlose; Herta Bruun, Graested, all of Denmark

[73] Assignee: Leo Pharmaceutical Products Ltd., Ballerup, Denmark

[22] Filed: June 12, 1974

[21] Appl. No.: 478,833

[30] Foreign Application Priority Data
June 22, 1973 United Kingdom............. 29858/73

[52] U.S. Cl.... 260/465 D; 260/294.8 C; 260/294.9; 260/295 R; 260/302 R; 260/309.6; 260/332.2 A; 260/347.2; 260/470; 260/486 R; 260/485 J; 260/302 S; 260/488 CD; 260/501.1; 260/501.17; 260/513.7; 260/515 S; 260/516; 260/517; 260/520; 424/263; 424/270; 424/273; 424/275; 424/285; 424/304
[51] Int. Cl......................................... C07c 147/06
[58] Field of Search .......... 260/470, 516, 517, 520, 260/465 D

[56] References Cited
UNITED STATES PATENTS
3,780,027  12/1973  Cragoe et al. .................... 260/470
FOREIGN PATENTS OR APPLICATIONS
2,061,994  6/1971  Germany ......................... 260/470
2,130,312  12/1971  Germany ......................... 260/470

*Primary Examiner*—John F. Terapane
*Attorney, Agent, or Firm*—Cushman, Darby & Cushman

[57] ABSTRACT

The present invention relates to a series of new compounds, their salts and esters and to methods for the preparation of the compounds having the general formula:

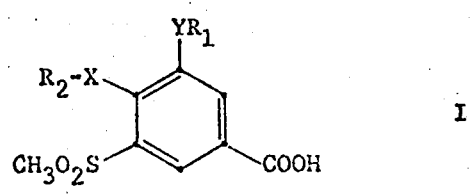

I in which $R_1$ represents a straight or branched $C_1-C_6$ alkyl, alkenyl or alkynyl radical, or a $C_1-C_3$ alkyl radical substituted with phenyl, halophenyl, trifluoromethylphenyl, (lower alkoxy)phenyl, or with a 5-membered or 6-membered heterocyclic ring containing not more than two heteroatoms selected from the group consisting of oxygen, sulphur and nitrogen; $R_2$ stands for a phenyl radical, optionally being substituted with halogen, lower alkyl, hydroxy, or lower alkoxy; X stands for oxygen, sulphur or C=O; Y stands for oxygen, sulphur or a methylene radical.

The compounds of the invention which are valuable in the human and veterinary practice, possess an outstanding diuretic and saluretic activity.

5 Claims, No Drawings

METHYLSULFONYL-BENZOIC ACID DERIVATIVES

This invention relates to a series of new compounds, their salts and esters and to methods for the preparation of the compounds which are valuable in the human and veterinary practice and have the general formula:

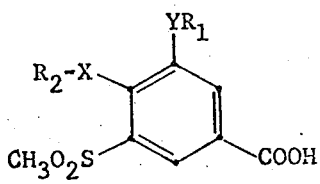

in which $R_1$ represents a straight or branched $C_1$–$C_6$ alkyl, alkenyl or alkynyl radical, or a $C_1$–$C_{13}$ alkyl radical substituted with phenyl, halophenyl, trifluoromethylphenyl, (lower alkoxy)phenyl, or with a 5-membered or 6-membered heterocyclic ring containing not more than two hetero atoms, selected from the group consisting of oxygen, sulphur and nitrogen; $R_2$ stands for a phenyl radical, optically being substituted with halogen, lower alkyl, hydroxy, or lower alkoxy; X stands for oxygen, sulphur or C=O; Y stands for oxygen, sulphur or a methylene radical.

In particular, $R_1$ may represent e.g. a methyl, ethyl, propyl, isopropyl, butyl, isobutyl, or tert. butyl radical, or one of the different isomeric pentyl, or hexyl radicals, an alkenyl or alkynyl radical, e.g. an allyl, or propargyl radical, a benzyl, a phenethyl, a phenylpropyl, or 2-, 3-, or 4-trifluoromethylphenylmethyl radical, a 2-, 3-, or 4-methoxyphenylmethyl radical, a 2-, 3-, or 4-pyridylmethyl, 2, or 3-furylmethyl, 2-, 3-thienylmethyl, thiazolylmethyl, or imidazolylmethyl radical; or one of the corresponding ethyl radicals.

In particular, $R_2$ may represent a phenyl, a methylphenyl, or a methoxyphenyl radical.

The substituents $R_1$ and $R_2$ of formula I can be further substituted in different positions with different groups, such as one or more halogen atoms, e.g. chlorine or bromine atoms, lower alkyl, halo-lower alkyl, e.g. trifluoromethyl; amino groups optionally being alkylated or acylated; hydroxy groups, which may be etherified, e.g. lower alkoxy, such as methoxy, ethoxy, n-propoxy, isopropoxy, n-butoxy or isobutoxy, or esterified with lower aliphatic carboxylic acids, such as lower alkanoic acids, e.g. acetic, propionic, or pivalic acid, lower alkenoic acids, e.g. acrylic or methacrylic acid, or with lower aliphatic dicarboxylic acids, e.g. oxalic, malonic, succinic, glutaric, adipic, maleic or fumaric acid, or their acid esters with lower alkanols, e.g. methanol or ethanol; or etherified mercapto groups such as methylthio, ethylthio, isopropylthio, butylthio or isobutylthio radicals.

Whenever the expression "lower" is used in the foregoing and in the following in connection with an organic radical it indicates a content of from 1 to 6 carbon atoms.

Of particular value are the compounds of the invention in which $R_1$ is selected from the group consisting of straight or branched $C_3$–$C_5$ alkyl radicals, and a methyl radical being substituted with phenyl, furyl, thienyl, and pyridyl, and the correspondingly substituted ethyl radicals.

The salts of the compounds of the invention are pharmaceutically acceptable salts, and include, for example, alkali metal salts, alkaline earth metal salts, the ammonium salt or amine salts formed, for instance, from mono-, di- or trialkanolamines or cyclic amines. The esters of the compounds are preferably derived from lower aliphatic alcohols, cyanomethanol and benzyl alcohol.

It has surprisingly been found that the compounds of the invention although not having a sulfonamide group and not being amino benzoic acid derivatives possess an outstanding diuretic and saluretic activity with a very low excretion of potassium ions and a low toxicity which make the present compounds particularly valuable in human and/or veterinary practice.

Further the compounds of the invention are also extremely valuable in the treatment of patients suffering from hypersensitivity towards sulfonamide diuretics.

The present compounds are effective after oral, enteral or parenteral administration, and are preferably prescribed in the form of tablets, pills, dragees, or capsules containing the free acid or salts thereof with atoxic bases, or the esters thereof, mixed with carriers and/or auxiliary agents.

Salts, which are soluble in water, may with advantage be administered by injection. The parenteral preparations are in particular useful in the treatment of conditions in which a quick dehydration is desirable, e.g. in the intensive therapy in the case of oedemas in the lung. In the continuous therapy of patients suffering from e.g. hypertension, the tablets or capsules may be the appropriate form of pharmaceutical preparation owing to the prolonged effect obtained when the drug is given orally, in particular in the form of sustained-release tablets.

In the treatment of heart failure and hypertension such tablets may advantageously contain other active components, as specified below.

Another object of the invention resides in the selection of a dose of one of the compounds of the invention or their salts or esters which can be administered so that the desired activity is achieved without simultaneous secondary effects. In such a dosage unit the compounds are conveniently administered as a pharmaceutical preparation containing from 0.5 mg to 50 mg of the active compound. The compounds of formula I are preferably administered in amounts from 1 mg to 25 mg. By the term "dosage unit" is meant a unitary, i.e. a single dose capable of being administered to a patient, and which may be readily handled and packed, remaining as a physically stable unit dose, comprising either the active material as such or in a mixture of it with a pharmaceutical carrier and auxiliary agents.

In the form of a dosage unit the compounds may be adminstered one or more times a day at appropriate intervals. The daily dose usually amounts to from 1 to 50 mg always depending, however, on the condition of the patients and according to the prescription of the medical practitioner.

In pharmaceutical compositions containing the compounds of the invention, organic or inorganic, solid or liquid carriers suitable for oral, enteral, or parenteral administration can be used to make up the composition. Gelatin, lactose, starch, magnesium stearate, talc, vegetable and animal fats and oils, gum, polyalkylene glycol, or other known carriers for medicaments are all suitable as carriers.

In the pharmaceutical compositions, the proportion of therapeutically active material to carrier substances can vary between 0.2 per cent and 90 per cent.

The compositions may further contain other therapeutic compounds applied in the treatment of, for example oedemas and hypertension, besides the well-known auxiliary agents. Such other compounds may be, for instance, Veratrum- or Rauwolfia alkaloids, e.g. reserpine, rescinnamine or protoveratrine or synthetic hypotensive compounds, e.g. hydralazine, or other diuretics and saluretics, such as the well-known benzothiadiazines, e.g. hydroflumethiazide, bendroflumethiazide, and the like. Potassium-sparing diuretics, e.g. triamterene, may also be used in the preparation of the compositions. For some purposes it may be desirable to add small amounts of aldosterone antagonists, e.g. spironolactone.

Still another object of the invention is to provide methods of preparing the compounds of the invention.

The compounds of the invention can be prepared according to the following reaction scheme:

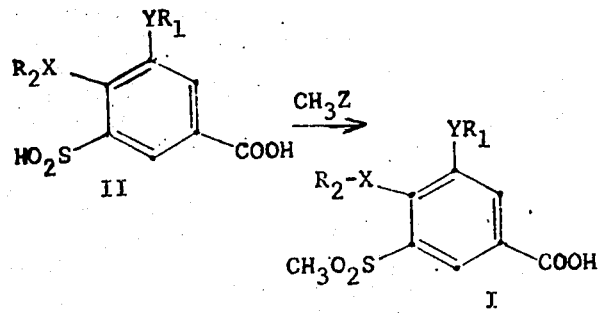

in which formulae the substituents $R_1$, $R_2$, X, and Y are as defined before, and Z stands for a halogen atom, e.g. a iodine atom, or an alkyl- or arylsulphonyloxy group, or $CH_3Z$ stands for dimethylsulfate.

The reaction between the compound of the formula II, if desired as a mono salt being a sulfinate, and the compound $CH_3Z$, is effected by heating the components in a suitable solvent or, when appropriate, by using the compound $CH_3Z$ as solvent. If the free sulfinic acid of formula II is used, the process is preferably performed in the presence of an acid binding agent. The temperature depends upon the reaction components used and will in most cases preferably be about the boiling point of the solvent.

If desired, the compound of formula II in which the carboxylic acid group is esterified can be used in the reactions, whereby the compound of the formula I is obtained as an ester. The corresponding free acid may, optionally, be obtained by a subsequent saponification. In case of the desired product being an ester and the starting material of formula II being the free acid, an esterification can be performed either before or after the alkylation process.

The starting compounds of formula II can e.g. be prepared from compounds of formula III

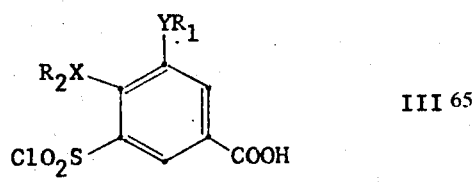

in which $R_1$, $R_2$, X, and Y have the above meanings, which compounds are known, or can be prepared by conventional methods for preparing analogous known compounds.

By reduction of the 5-halosulfonyl group, for instance by means of sodium sulphite in known manner, the corresponding sulfinic acids of the general formula II are obtained and isolated either as the free acids or a mono salt, e.g. a mono sodium salt.

The reactions described above for the production of the starting materials of formula II are well known to the skilled chemist, and the reaction products are easily isolated.

The invention will now be illustrated by the following non-limiting Examples from which the details of the embodiments will be apparent.

EXAMPLE 1

Mono sodium salt of
4-benzoyl-3-n-butoxy-5-sulfinobenzoic acid

Sodium sulfite (6 g) is added to water (70 ml) and while stirring and keeping the temperature between 10°C and 15°C, 4-benzoyl-3-n-butoxy-5-chlorosulfonylbenzoic acid (5 g) is added in portions during two hours. The reaction mixture is kept at pH 8 by adding 2 N sodium hydroxide via an automatic end-point titrator. After the base consume has ceased, the mono sodium salt of 4-benzoyl-3-n-butoxy-5-sulfinobenzoic acid is precipitated (from the filtered reaction mixture) by addition of concentrated hydrochloric acid until pH 3 at approximately 5°C.

EXAMPLE 2

Mono sodium salt of
4-benzoyl-3-benzyloxy-5-sulfinobenzoic acid

By replacing 4-benzoyl-3-benzyloxy-5-chlorosulfonylbenzoic acid for 4-benzoyl-3-n-butoxy-5-chlorosulfonylbenzoic acid in Example 1, mono sodium salt of 4-benzoyl-3-benzyloxy-5-sulfinobenzoic acid is obtained.

EXAMPLE 3

Mono sodium salt of
3-benzyloxy-4-(4'-methylbenzoyl)-5-sulfinobenzoic acid

By replacing 4-(4'-methylbenzoyl)-3-benzyloxy-5-chlorosulfonylbenzoic acid for 4-benzoyl-3-n-butoxy-5-chlorosulfonylbenzoic acid in Example 1, mono sodium salt of 3-benzyloxy-4-(4'-methylbenzoyl)-5-sulfinobenzoic acid is obtained.

EXAMPLE 4

Mono sodium salt of
3-n-butylthio-4-phenoxy-5-sulfinobenzoic acid

By replacing 3-n-butylthio-5-chlorosulfonyl-4-phenoxybenzoic acid for 4-benzoyl-3-n-butoxy-5-chlorosulfonylbenzoic acid in Example 1, mono sodium salt of 3-n-butylthio-4-phenoxy-5-sulfinobenzoic acid is obtained.

EXAMPLE 5

3-Benzylthio-4-(p-methoxyphenoxy)-5-sulfinobenzoic acid

By replacing 3-benzylthio-5-chlorosulfonyl-4-(p-methoxybenzoic acid for 4-benzoyl-3-n-butoxy-5- chlorosulfonylbenzoic acid in Example 1 and by acidifying the reaction mixture to pH 1, 3-benzylthio-4-(p-methoxyphenoxy)-5-sulfinobenzoic acid is obtained.

EXAMPLE 6

Mono sodium salt of 3-benzylthio-4-phenylthio-5-sulfinobenzoic acid

By replacing 3-benzylthio-5-chlorosulfonyl-4-phenylthiobenzoic acid for 4-benzoyl-3-n-butoxy-5-chlorosulfonylbenzoic acid in Example 1 and by acidifying the reaction mixture to pH 2.5, mono sodium salt of 3-benzylthio-4-phenoxy-5-sulfinobenzoic acid is obtained.

EXAMPLE 7

3-Benzylthio-4-(p-methylphenylthio)5-sulfinobenzoic acid

By replacing 3-benzylthio-5-chlorosulfonyl-4-(p-methylphenylthio)benzoic acid for 4-benzoyl-3-n-butoxy-5-chlorosulfonylbenzoic acid in Example 1 and acidifying the reaction mixture to pH 1, 3-benzylthio-4-(p-methylphenylthio)-5-sulfinobenzoic acid is obtained.

EXAMPLE 8

4-Benzoyl-3-n-butoxy-5-methylsulfonylbenzoic acid

A mixture of the mono sodium salt of 4-benzoyl-3-n-butoxy-5-sulfinobenzoic acid (0.45 g) and methyl iodide (25 ml) is refluxed for 8 hours. After evaporation of the reaction mixture in vacuo, the resulting residue is dissolved in 1 N sodium hydrogen carbonate (10 ml). The solution is extracted with diethyl ether, whereafter the aqueous layer is acidified with 4 N hydrochloric acid. The resulting precipitate is collected by filtration and washed with water. After recrystallization from aqueous methanol and drying in air, 4-benzoyl-3-n-butoxy-5-methylsulfonylbenzoic acid is obtained with a melting point of 203.5°–205°C.

EXAMPLE 9

4-Benzoyl-3-benzyloxy-5-methylsulfonylbenzoic acid

By replacing the mono sodium salt of 4-benzoyl-3-benzyloxy-5-sulfinobenzoic acid (0.5 g) for the mono sodium salt of 4-benzoyl-3-n-butoxy-5-sulfinobenzoic acid (0.45 g) in Example 8, and recrystallization of the precipitated material from aqueous ethanol, 4-benzoyl-3-benzyloxy-5-methylsulfonylbenzoic acid is obtained with a melting point of 205°–206°C.

EXAMPLE 10

3-Benzyloxy-4-(4'-methylbenzoyl)-5-methylsulfonylbenzoic acid.

A mixture of the mono sodium salt of 3-benzyloxy-4-(4'-methylbenzoyl)-5-sulfinobenzoic acid (0.86 g), methyl iodide (30 ml), and methanol (5ml) is refluxed for 6 hours. After evaporation of the reaction mixture in vacuo, the resulting residue is triturated with 1 N sodium hydrogen carbonate (40 ml). The precipitating sodium salt of 3-benzyloxy-4-(4'-methylbenzoyl)-5-methylsulfonylbenzoic acid is collected by filtration and dried in air. From a hot solution of the sodium salt in water, 30-benzyloxy-4-(4'-methylbenzoyl)-5-methylsulfonylbenzoic acid is precipitated by addition of 4 N hydrochloric acid until pH 2. After collection and recrystallization from aqueous ethanol, the desired compound is obtained with a melting point of 209°–210°C.

EXAMPLE 11

3-n-Butylthio-5-methylsulfonyl-4-phenoxybenzoic acid

A mixture of the mono sodium salt of 3-n-butylthio-4-phenoxy-5-sulfinobenzoic acid (1 g), methyl iodide (8 ml) and methanol (2 ml) is refluxed for 3 hours. After evaporation of the reaction mixture in vacuo, the resulting residue is dissolved in 1 N sodium hydrogen carbonate (20 ml). The solution is extracted with diethyl ether, whereafter the aqueous layer is acidified with 4 N hydrochloric acid (5 ml). The resulting precipitate is collected by filtration and washed with water. After recrystallization from aqueous methanol and acetone/petroleum ether, 3-n-butylthio-5-methylsulfonyl-4-phenoxybenzoic acid is obtained with a melting point of 185°–186°C.

EXAMPLE 12

3-Benzylthio-4-(p-methoxyphenoxy)-5-methylsulfonylbenzoic acid

A mixture of 3-benzylthio-4-(p-methoxyphenoxy)-5-sulfinobenzoic acid (0.96 )g, methyl iodide (25 ml), and methanol (15 ml) containing 2 millimols of sodium methanolate is refluxed for 5 hours. Following the working up procedure given for 3-n-butylthio-5-methylsulfonyl-4-phenoxybenzoic acid in Example 11, and recrystallizing the precipitated material from methanol, the 3-benzylthio-4-(p-methoxyphenoxy)-5-methylsulfonylbenzoic acid is obtained with a melting point of 206.5°–207°C.

EXAMPLE 13

3-Benzylthio-5-methylsulfonyl-4-phenylthiobenzoic acid

A mixture of the mono sodium salt of 3-benzylthio-4-phenylthio-5-sulfinobenzoic acid (0.35 g), methyl iodide (25 ml) and methanol (5 ml) is refluxed for 6 hours. Following the working up procedure given for 3-n-butylthio-5-methylsulfonyl-4-phenoxybenzoic acid in Example 11, and recrystallizing the precipitated material from aqueous methanol, and from methanol, the 3-benzylthio-5-metylsulfonyl-4-phenylthiobenzoic acid is obtained with a melting point of 216°–217°C.

EXAMPLE 14

3-Benzylthio-4-(p-methylphenylthio)-5-methylsulfonylbenzoic acid

By replacing 3-benzylthio-4-(p-methylphenylthio)-5-sulfinobenzoic acid for the 3-benzylthio-4-(p-methoxyphenoxy)-5-sulfinobenzoic acid of Example 12 and recrystallizing the precipitated material from aqueous methanol, 3-benzylthio-4-(p-methylphenylthio)-5-methylsulfonylbenzoic acid is obtained with a melting point of 164.5°–166°C.

What we claim is:

1. A compound selected from the group consisting of a compound having the formula:

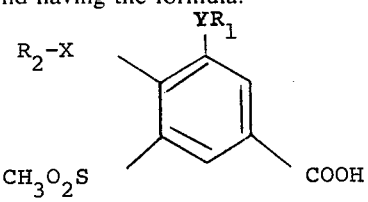

I in which $R_1$ represents a straight or branched $C_1$–$C_6$ alkyl radical, or benzyl; $R_2$ stands for a phenyl radical, optionally being substituted with lower alkyl or lower alkoxy; X stands for oxygen, sulphur or $$>C=O;$$

Y stands for oxygen or sulphur; a pharmaceutically acceptable, non-toxic salt thereof; and an ester thereof with cyano methanol, benzyl alcohol and $C_1$–$C_6$ alkanol.

2. A compound selected from the group consisting of 4-benzoyl-3-n-butoxy-5-methylsulfonylbenzoic acid a pharmaceutically acceptable, non-toxic salt and an ester thereof with cyano methanol, benzyl alcohol and $C_1$–$C_6$ alkanol.

3. A compound selected from the group consisting of 4-benzoyl-3-benzyloxy-5-methylsulfonylbenzoic acid, a pharmaceutically acceptable, non-toxic salt and an ester thereof with cyano methanol, benzyl alcohol and $C_1$–$C_6$ alkanol.

4. A compound selected from the group consisting of 3-benzyloxy-4-(4'-methylbenzoyl)-5-methylsulfonylbenzoic acid, a pharmaceutically acceptable, non-toxic salt and an ester thereof with cyano methanol, benzyl alcohol and $C_1$–$C_6$ alkanol.

5. A compound selected from the group consisting of 3-n-butylthio-5-methylsulfonyl-4-phenoxybenzoic acid, a pharmaceutically acceptable, non-toxic salt and an ester thereof with cyano methanol, benzyl alcohol and $C_1$–$C_6$ alkanol.

* * * * *